United States Patent [19]
Shibata et al.

[11] Patent Number: 4,705,977
[45] Date of Patent: Nov. 10, 1987

[54] MOLDED COMMUTATOR WITH ENLARGED DIAMETER RISER SECTION

[75] Inventors: Takashi Shibata, Isesaki; Nobuo Yamada; Yoshikazu Mada, both of Kiryu; Masaki Iizima, Niisato, all of Japan

[73] Assignee: Mitsuba Electric Manufacturing Co., Ltd., Gunma, Japan

[21] Appl. No.: 892,133

[22] Filed: Jul. 30, 1986

[30] Foreign Application Priority Data

Feb. 10, 1986 [JP] Japan .................................. 61-18002
May 8, 1986 [JP] Japan ................................ 61-106249

[51] Int. Cl.⁴ ........................ H01R 43/08; H02K 15/00
[52] U.S. Cl. ....................................... 310/235; 29/597; 310/42
[58] Field of Search ................. 29/450, 525, 597, 598; 264/272.19, 272.2, 274; 310/42, 235, 236, 233, 234

[56] References Cited

U.S. PATENT DOCUMENTS 3,566,460 3/1971 Yamaguchi ......................... 310/235
3,785,025 1/1974 Wolf ...................................... 29/525
4,082,318 4/1978 Mueller, Jr. ........................... 29/450
4,399,383 8/1983 Kamayama ......................... 310/236

*Primary Examiner*—Patrick R. Salce
*Assistant Examiner*—D. L. Rebsch
*Attorney, Agent, or Firm*—Kane, Dalsimer, Sullivan, Kurucz, Levy, Eisele and Richard

[57] ABSTRACT

A commutator for use with a DC motor or a DC generator. The parent metal of the segments of the commutator is formed with bulging portions which have their outer surfaces generally coextending with the outer surfaces of protecting portions for contacting brushes. This commutator is manufactured by forming a cylinder of a plate of a conductive material, by forming a plurality of pawls on the circumference of the cylinder, by molding a boss of a synthetic resin in the cylinder, by forming a plurality of notches in one end of the cylinder, and by cutting the trunk of the cylinder with a plurality of slits to form a plurality of separate segments.

6 Claims, 37 Drawing Figures

MOLDED COMMUTATOR WITH ENLARGED DIAMETER RISER SECTION

BACKGROUND OF THE INVENTION

1. Field of the Invention

The present invention relates to a commutator for use with a DC motor or a DC generator and more particularly, to an improvement in the and, more particularly, to an improvement in the construction of commutator segments (which will be hereafter referred to as "segments"), which is effective when applied to a commutator having its segments covered on their parent metal surfaces with protecting portions.

2. Related Art Statement

In some commutators for coping with gasohol, the segments have their parent metal of copper cladded with protecting portions of a silver-nickel alloy on at least its surface for contacting brushes (as is disclosed in Japanese Utility Model Laid-Open No. 60-135063, for example).

A process for manufacturing such commutators includes: the step of curling a material plate of copper covered with a cladding plate into a cylindrical shape; the step of forming a boss of a resin in the hollow portion of the cylinder by fitting the cylinder in a molding die; and the step of longitudinally slitting the cylindrical material plate and the cladding plate to form a plurality of segments.

In this commutator manufacturing process, since there is difference in level between the outer circumferences of the copper plate and the cladding plate, the step of molding the boss of a resin in the cylinder is accompanied by the problem that the material plate is deformed by the resin injection pressure and that the resin flows out of the cylinder.

On the other hand, some commutators to be used with a DC motor or the like are so constructed that a group of segments are anchored at the outer circumference of the boss molded of an insulating material.

A process of manufacturing such commutators is effected: by cutting one end portion of a cylinder of a conducting material to arrange a plurality of notches circumferential equi-distantly thereby to form riser members; by subsequently setting the cylinder in a molding die while positioning the riser members in respective holes formed in advance in the die; by injecting an insulating material into the hollow portion of the cylinder to form a boss; and by subsequently cutting the trunk of the cylinder to arrange each of a plurality of slits between adjacent two of the riser members thereby to form the individual segments.

The processes described above for manufacturing those commutators are accompanied by the following problems because the riser members are fitted in the respective holes of the molding die:

(1) The workability is low;

(2) The resin is liable to remain in each of the holes of the molding die, thereby to make insertions of the riser members insufficient; and (3) In the case of using a cylinder cladded with a protecting material (as in a later-described embodiment 2), the parent metal of the cylinder is annealed to make the riser members liable to be bent, thereby to cause the insufficient insertions.

SUMMARY OF THE INVENTION

An object of the present invention is to solve the above problems and to provide a commutator structure which can prevent deformation of its segments and leakage of the resin.

Another object of the present invention is to provide a process for manufacturing a commutator structure with an excellent workability to properly form the riser members.

In order to achieve the above-specified object, the commutator structure according to the present invention is characterized in that commutator segments are made to bulge at an end portion of a parent metal such that the outer surfaces of the bulging portions are generaly coextensive with the outer surface of a protecting cover. If the parent metal of the segments is formed with the bulging portions, it is possible to obviate the material plate from being deformed and the resin from flow out even with the injection pressure being applied during molding because there is no difference in level between the parent material of the boss and the protecting members.

On the other hand, the process for manufacturing the commutator structure in accordance with the presnt invention is characterized in that, after the boss has been molded in the hollow portion of the cylinder as it is, the respective one-end portions of the cylinder and the boss are cut to form riser members and recesses.

Since the step of molding the boss of the resin is carried out according to this process while leaving the cylinder as it is, this cylinder can be easily set in the molding die with a resultantly excellent workability. Since the molding die is not formed with holes for fitting the riser members therein, it is possible to obviate the residual of resin in the holes and the insufficient insertion of the riser members.

BRIEF DESCRIPTION OF THE DRAWINGS

The above and other objects and features of the present invention will become more apparent when referred to the following description given in conjunction with the accompanying drawings, wherein like reference numerals denote like elements, and in which.

DESCRIPTION OF THE PREFERRED EMBODIMENTS

Figure 1:
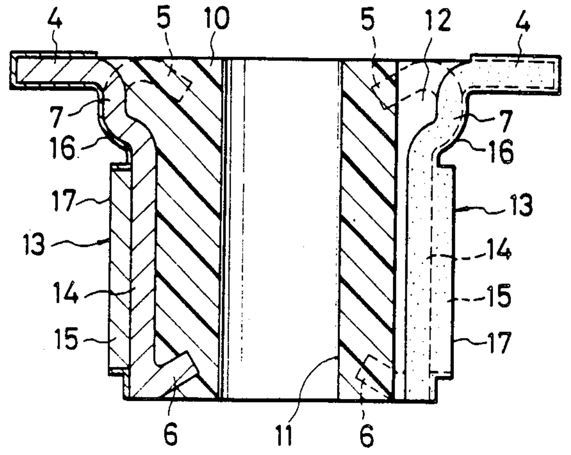
FIG. 1 is a longitudinal section showing a commutator structure according to one embodiment of the present invention.

Referring now to the drawings FIG. 1 is an enlarged longitudinal section showing a commutator structure according to one embodiment of the present invention, and FIGS. 2 to 11 are explanatory views for explaining the process for manufacturing the commutator structure and the operations of the same.

In the present embodiment, the commutator shown in FIG. 1 is constructed of: a boss 10 molded of a resin in a thick cylinder; a plurality of (e.g., three in the present embodiment for descriptive and illustrative purposes) segments arranged generally equi-distantly on the outer circumference of the boss 10; riser members 4 integrated with the segments 13, respectively; and slits 12, each for electrically isolating the adjacent two segments 13 and 13. Each of these segments 13 is made of a parent metal of copper and is formed with a protecting member 15 cladded with copper-nickel alloy on the surface of the parent metal 14 for contacting a brush (not shown) and pawls 5 and 6 for fixing the segment 13 on the boss 10. The parent metal 14 is formed at its end portion at the side of the riser members 4 with bulging portions 7 which are made to bulge outward, to have their surfaces generally coextensive with the outer surfaces of the protecting members 15. Moreover, the segment metal 14 is covered on its surface with a tin-plated cover film 16 of such a metal as will not interact with gasohol. The cover film 16 is partially removed, to expose the outer surface of the protecting members 15, as at 17, to the outside.

One embodiment of the process for manufacturing the commutator structure thus constructed will be described in the following, to clarify the detailed construction and the operational effects of the same.

Figure 2:
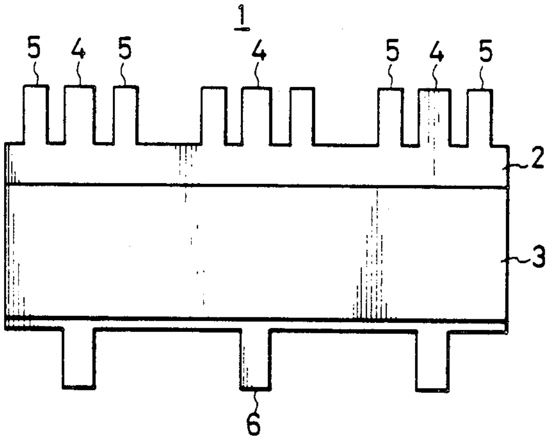
FIG. 2 is a front elevation showing a material plate to be used at a first step of a process for manufacturing the commutator structure.

FIG. 2 is a front elevation showing the material plate to be used at the first step of the commutator structure manufacturing process.

In FIG. 2, a material plate 1 is constructed of a base plate 2 of copper formed into a generally rectangular panel shape, and this base plate 2 is cladded on one surface with a cladding plate 3 which is formed of silver-nickel alloy into a generally rectangular band shape. The material plate 2 has its one longer side (which will be assumed to be located at an upper side) formed with a plurality of rectangular riser elements 4 which are projected integrally therefrom and arranged at a predetermined spacing. The upper side of the material plate 2 is further formed with upper pawls 5 which are arranged at both sides of each of the riser members 4. From the lower longer side of the base plate 2, on the other hand, there are integrally projected the lower pawls 6 which are arranged in positions opposed to the respective risers 4.

Figure 3:
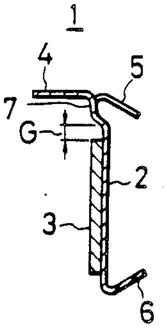
FIG. 3 is a longitudinal section showing the state in which the material plate is formed with a bulging portion.

FIG. 3 is a longitudinal section showing the state in which the material plate shown in FIG. 2 is made to bulge.

As shown in FIG. 3, the bulging portion is arranged on the base plate 2 along the upper edge at the upper end portion formed with the riser members 4. The bulging portion is formed integrally from the side (which will be called the "outer side"), at which the cladding plate 3 is fixed, to have a constant width and a constant height by suitable forming means such as pressing means. The height of the bulging portion 7 is so set that its outer surface is generally coextensive with that of the cladding plate 3. On the other hand, the lower side of the bulging portion 7 is arranged with a predetermined gap G from the upper side of the cladding plate 3. Moreover, the riser members 4 and the upper and lower pawls 5 and 6 are bent outward and inward, respectively.

Figure 4:
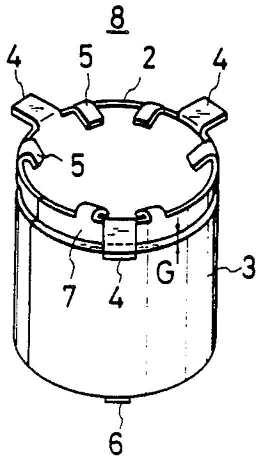
FIG. 4 is a perspective view showing a shrink-ring which is formed by curling the material plate.

FIG. 4 is a perspective view showing the state in which the material plate having the bulging portion shown in FIG. 3 is curled.

As shown in FIG. 4, the material plate 1 is curled to dispose the cladding plate 3 at the outer side with its two shorter sides arranged and fixed one on the other to form a shrink-ring 8.

Figure 5:
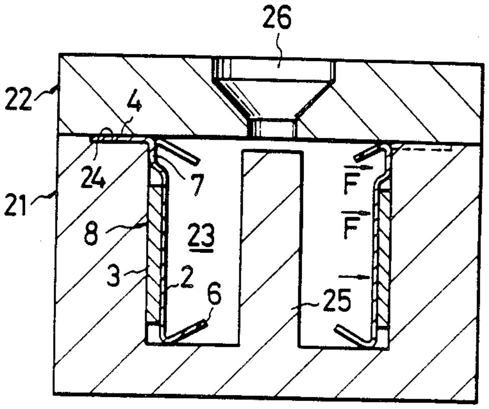
FIG. 5 is a longitudinal section showing the state in which a boss is molded of a resin in the shrink-ring.

FIG. 5 is a longitudinal section showing the state in which a boss of a resin is molded in the shrink-ring shown in FIG. 4.

A molding die to be used for this molding operation is constructed of a bottom part 21 and a top part 22. The bottom part 21 is composed of: a cylindrical cavity having a diameter corresponding to the external diameter of the shrink-ring 8; grooves 24 formed horizontally from the upper portion of the cavity 23 and radially to correspond to the shape and arrangement of the riser members 4; and a core 25 for forming an axial bore in which the commutator structure is fitted on a shaft of rotation. The top part 22 is opened to form a gate 26 for injecting a resin as a molding material therethrough into the cavity 23.

Figure 7:
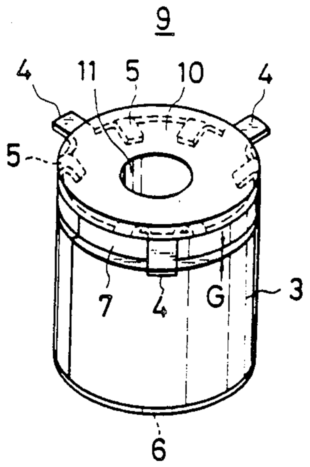
FIG. 7 is a perspective view showing a monolithic molding of a resin.

Then, the shrink-ring 8 thus curled at the preceding step is inserted into the cavity 23 of the bottom part 21 such that it is concentric to the core 25, with its riser members 4 being positioned at the upper side and aligned with the grooves 24, respectively. Subsequently, the bottom part 21 and the top part 22 are clamped, and the resin is pumped from the gate 26 into the hollow portion of the shrink-ring 8 set in the cavity 23. As a result of this resin injection, a monolithic resin molding 9 shown in FIG. 7 is made.

Here, when the resin is injected, a radially outward force F is exerted upon the shrink-ring 8, as indicated by arrows in FIG. 5.

Figure 6:
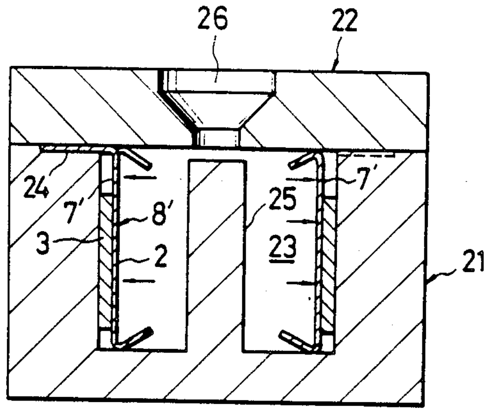
FIG. 6 is a longitudinal section for explaining the operations at the resin molding step.

Incidentally, in the case of a shrink-ring 8′ having no bulging portion, as shown in FIG. 6, a step 7′ is formed at a portion under consideration between the outer surfaces of the base plate 2 and the cladding plate 3. For parting necessity, on the other hand, the cavity 23 in the bottom part 21 cannot be formed to fill the step 7′ so that this step 7′ will leave the inner face of the cavity 13. If, moreover, the resin is injected into the hollow portion of the shrink-ring 8′ to apply the outward force F to the step 7′, this step 7′ is irregularly made to bulge and deformed outward because it is not supported by the cavity 23. Since this deformation is caused uncontrollably and irregularly, the problem of resin leakage or the like is caused by deformation or cracking, as has been clarified by us.

In the present embodiment, however, the bulging portion 7 is formed in advance at the upper end portion of the base plate 2, as has been described hereinabove; the shrink-ring 8 is not deformed irregularly, even under the resin injection pressure, to obviate the problem, which might otherwise accompany it, in advance. More specifically, the bulging portion 7 is made to bulge, to have its outer surface coextensive with that of the cladding plate 3, and is supported in abutment against the inner surface of the cavity 23 so that the irregular deformation is prevented, even under the outward resin injection pressure.

FIG. 7 is a perspective view showing a monolithic resin molding.

As shown in FIG. 7, the boss 10 is integrally molded of a resin in the hollow portion of the shrink-ring 8 and is formed on its center line with an axial bore by means of the core.

Figure 8:
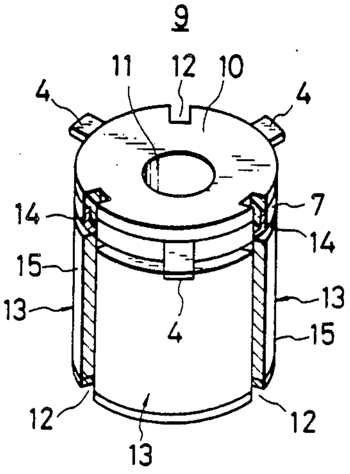
FIG. 8 is a perspective view showing the state in which the monolithic resin molding is cut.

FIG. 8 is a perspective view showing the state in which the monolithic resin molding is cut.

As shown in FIG. 8, the shrink-ring 8 of the monolithic resin molding 9 is formed by suitable means such as a cutting tool (although not shown) with a plurality of slits 12, each of which is arranged in parallel with the axis and between every adjacent two riser members 4 and 4. These slits 12 are formed by cutting and separating the base plate 2 and the cladding plate 3 to a depth reaching the boss 10 to substantially construct the segments 13, any adjacent two of which are electrically isolated from each other. More specifically, each of the segments 13 is composed of the parent metal 14 and the protecting member 15, which are separated from others of another segment, and the parent metal 14 is formed integrally with the riser members 4 and the upper and lower pawls 5 and 6. These upper and lower pawls 5 and 6 are buried in the boss 10 to integrate the segments 13 with the boss 10 reliably.

Figure 9:
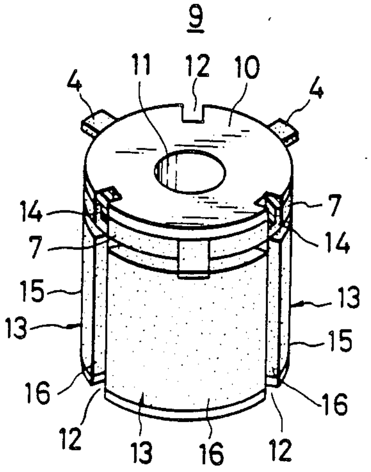
FIG. 9 is a perspective view showing the state in which the segments have their surfaces covered with a cover film.

After that, as shown in FIG. 9, the individual segments 13 have their surfaces covered with tin-plated cover films 16 by suitable means such as electrolytic plating. Those tin-plated cover films 16 are used for preventing the copper body from being exposed to a fuel such as the gasohol, to prevent deterioration of the fuel and to improve durability of the commutator structure.

Figure 10:
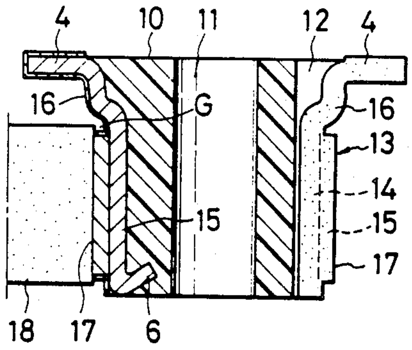
FIG. 10 is a longitudinal section showing the state in which the cover film is partially removed.

Next, as shown in FIG. 10, the tin-plated cover film 16 on the protecting members 15 is removed by suitable means using a cutting tool 18 or the like to form exposed surfaces 17 on the protecting members 15 providing the sliding surfaces with the brush. These protecting members 15 will not interfere with the gas holes, but have high wear resistance, because they are made of the silver-nickel alloy.

Figure 11:
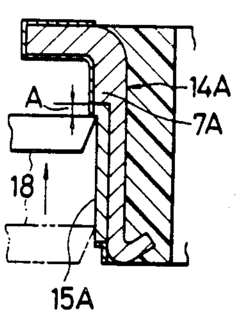
FIGS. 11 and 12 are longitudinal partial sections for explaining the respective operations when the cover film is to be removed.

Incidentally, in case projections 7A at the upper end portion of a parent metal 14A are in close contact with protecting members 15A, as shown in FIG. 11, so that they merge into each other, a cutting clearance A is to be left in the portions of the protecting members 15A adjacent to the projections 7A so as to expose, not the copper body of the parent metal 14A, but the surfaces of the protecting members 15A to the outside. This means that the protecting members 15A cannot be used effectively to an extent of the cutting clearance A to waste the expensive silver-nickel alloy.

In the present embodiment, however, the gap G is formed between the lower side of the bulging portions 7 of the parent metal 14 and the upper side of the protecting members 15. As a result, the surface 17 of the protecting members 15 can be wholly exposed to the outside by removing the tin-plated cover film 16 fully to the vertical width of the protecting members 15. In other words, since the gap G is left even by cutting the whole surface of the protecting members 15, there is no fear of cutting the tin-plating cover film 16 on the parent metal 14, so that the copper body of the parent metal 14 is exposed to the outside. As a result, the expensive protecting members 15 can be effectively used fully to their vertical width to an economical advantage.

Figure 12:
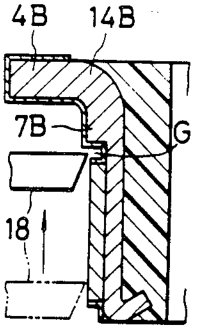

Incidentally, as shown in FIG. 12, there can be conceived a construction in which the gap G is formed in the projections 7B of a parent metal 14B.

However, this causes other problems; namely, the cost is increased, and since the upper end portion of the base plate is thickened, it is more difficult to work riser members 4B.

In the present embodiment, however, those problems are not raised because the base plate has an equal thickness in its entirety.

Thus, the commutator structure described with reference to FIG. 1 is now made.

Moreover, the present invention should not be limited to the embodiment thus far described but can naturally be modified in various manners without departing from the gist thereof.

For example, the boss should not be limited to the process in which it is molded of resin with the riser members being bent outward, but may be molded of resin with the riser members being left upright.

The application of the present invention should not be limited to the commutator which is dipped for use in the gasohol but is applicable to a general commutator which is used in an arbitrary atmosphere such as a liquid or gaseous atmosphere, and the materials of the parent metal and the protecting members are not limited to those embodiments thus far described.

The number of segments are exemplified by three, as shown, so as to facilitate understanding, but may be four or more.

As has been described hereinbefore, according to the present embodiment, provision of the bulging portions at the end of the parent metal of the segments makes it possible to prevent the irregular deformation of the parent metal due to the resin injection pressure, so that a proper commutator structure can be obtained.

FIGS. 13 to 17 shows the respective steps of the process for manufacturing the commutator structure in accordance with one embodiment of the present invention. The process according to this embodiment will be described in the following with reference to FIGS. 13 to 17.

Figure 13:
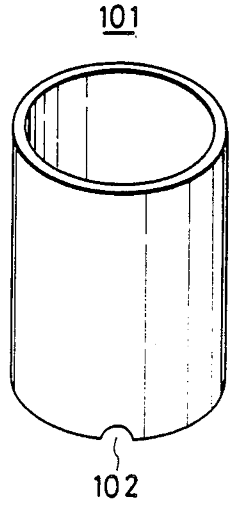
FIG. 13 is a perspective view showing a cylinder to be used in one embodiment of the process for manufacturing the commutator structure of the present invention.

FIG. 13 is a perspective view showing a cylinder to be used in the commutator structure manufacturing process of the present embodiment.

In FIG. 13, a cylinder 101 to be used in the commutator structure manufacturing process of the present embodiment is prepared by cutting a pipe made of a conducting material such as copper to have a predetermined length. The cylinder 101 thus prepared is then formed in its one end side (which will be referred to as the "lower end side") with a plurality of generally semicircular recesses 102 which are arranged in predetermined positions.

Figure 14:
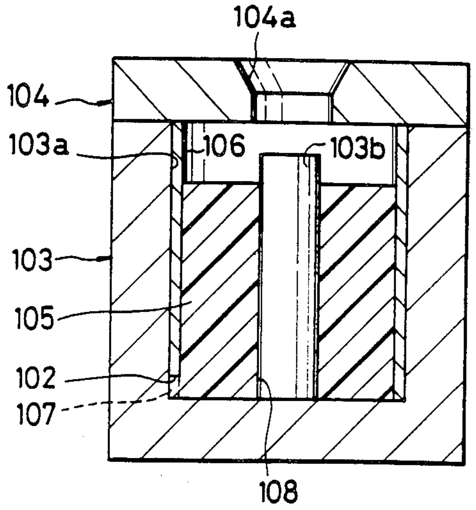
FIG. 14 is a section showing the state in which a resin is molded in the cylinder shown in FIG. 13.

FIG. 14 is a section showing the state in which a resin is molded in the cylinder shown in FIG. 13.

A molding die to be used here is constructed of a bottom part 103 and an upper part 104. The bottom part 103 is formed with a cylindrical cavity 103*a* having a diameter corresponding to the external diameter of the cylinder 101. From the bottom of the cavity 103*a*, there is concentrically projected a core 103*b* which is made cylindrical to have a predetermined external diameter for forming an axial bore in which the commutator structure is fixed on a shaft of rotation. The top part 104 is opened to form a gate 104*a*, through which a molding material or a resin can be injected into the cavity 103*a*.

Moreover, the aforementioned cylinder 101 is set in the bottom part 103, as shown in FIG. 14. At this time, the workability is excellent because it is sufficient to fit in the cylinder 101 into the cavity 103*a* of the bottom part 103. Subsequently, the top part 104 is placed on the upper face of the bottom part 103, and the resin is injected from the gate 104*a* to a predetermined level. The resin to be used is one having an insulating property such as Bakelite. At this time, little resin is left in the cavity 103*a* because the cavity 103*a* does not have an uneven surface.

Figure 15:
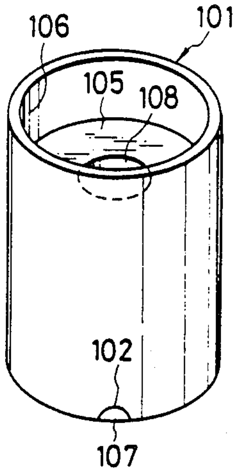
FIG. 15 is a perspective view showing a monolithic resin molding obtained by the resin molding step shown in FIG. 14.

FIG. 15 is a perspective view showing the monolithic resin molding which is prepared by the resin molding method shown in FIG. 14.

As shown in FIG. 15, a boss 105 is molded of a resin in the hollow portion of the cylinder 101 such that a recess 106 is left above the hollow portion of the cylinder 101. The resin of the boss 105 partially fills up the recesses 102 of the cylinder 101 to substantially form projections 107. The boss 105 is formed on its center line with an axial bore 108.

Figure 16:
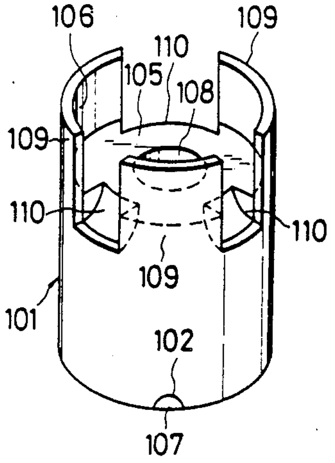
FIG. 16 is a perspective view showing the state in which the monolithic resin molding is formed with riser members and recesses.

FIG. 16 is a perspective view showing the state in which riser members and recesses are formed on and in the monolithic resin molding.

As shown in FIG. 16, the cylinder 101 and the boss 105 are cut at their respective upper portions by means of a rotating cutting tool (although not shown) to form a plurality of (e.g., three in the present invention for descriptive and illustrative conveniences, as in the following) riser members 109 and positioning recesses 110, respectively, which are arranged circumferentially equi-distantly to have a predetermined width and a predetermined depth, respectively.

Figure 17:
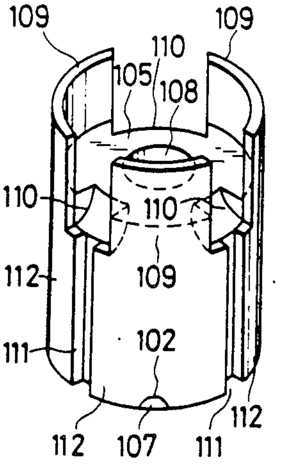
FIG. 17 is a perspective view showing the state in which individual segments are formed.

FIG. 17 is a perspective view showing the state in which individual segments are formed.

As shown in FIG. 17, the trunk of the cylinder 101 thus formed with the riser members 109 is cut to a dividing depth in parallel with the axis to form segments 112 each of which is arranged between any two adjacent riser members 109 and 109 thereby to form each of segments 112 between any two adjacent slits 111. Each segment 112 is electrically insulated from another by the slits 111 and is made to merge into the corresponding one of the riser members 109 so that they may be electrically connected with each other.

Incidentally, each riser member 109 is then bent back outward by holding the base end portion of the corresponding segment 112 and is fused and connected by hooking an armature coil thereon.

When the commutator structure thus made is to be fixed on the shaft of rotation, moreover, each of the positioning recesses 110 is made to receive the corresponding one of projections which are formed on the armature so that they may come into phase.

The following advantages can be obtained according to the embodiment thus far described:

(1) the cylinder can be set remarkably easily in the molding die because the resin molding step of the boss is executed with the cylinder as it is;

(2) Since no hole for receiving each of the riser members is formed in the molding die, it is necessarily possible to obviate the resin from being left in the holes and the insufficient insertion of the rise members; and (3) The productivity can be enhanced because no change of the molding die is required even in case the number of the segments and the shape of the positioning recesses are changed.

FIGS. 18 to 27 show a process for manufacturing the commutator structure in accordance with still another embodiment of the present invention. This embodiment will be described in the following with reference to FIGS. 18 to 27.

Figure 18:
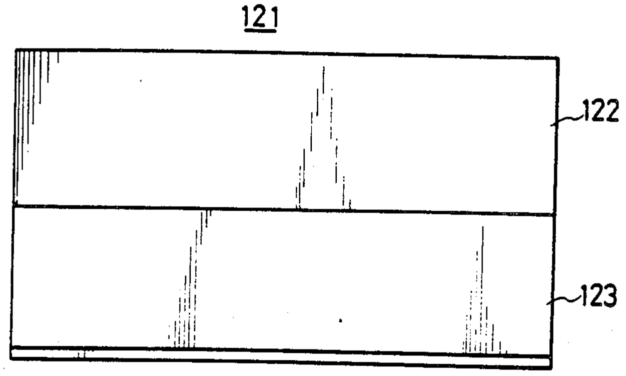
FIG. 18 is a front elevation showing a material plate to be used in a commutator structure manufacturing process according to another embodiment of the present invention.

FIG. 18 is a front elevation showing a material plate to be used in the commutator structure manufacturing process according to the present embodiment.

In FIG. 18, a material plate 121 is constructed of a base plate 122 which is made of copper and formed into a generally rectangular panel. This base plate 122 is covered on substantially one half (which will be referred to as a "lower side"), taken in the shorter direction, of its one side with a cladding plate 123 which is formed of silver-nickel alloy into a generally rectangular band.

Figure 19:
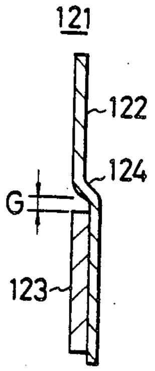
FIG. 19 is a longitudinal section showing the state in which the material plate shown in FIG. 18 is stepped.

FIG. 19 is a longitudinal section showing the state in which a step is formed in the material plate shown in FIG. 18.

As shown in FIG. 19, the base plate 122 is so arranged at its substantially central portion, taken in the height direction, with a step 124 as to extend along the upper side end of the cladding plate 123. The step 124 is made by pressing or suitable shaping means to bulge integrally therefrom with a constant width and a constant height in the direction (which will be referred to as "outward"), in which the cladding plate projects. The step 124 has its height set such that its outer surface is generally coextensive with that of the cladding plate 123. Moreover, the step 124 is arranged such that its lower side is spaced at a predetermined gap from the upper side of the cladding plate 123.

Figure 20:
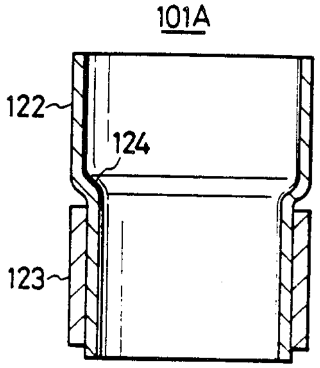
FIGS. 20 and 21 are a sectional front elevation and a top plan view showing the state in which the stepped material plate shown in FIG. 19 is curled into a cylinder.
Figure 21:
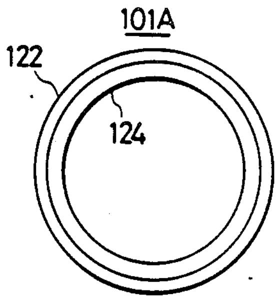

FIGS. 20 and 21 are a sectional front elevation and a top plan view showing the state in which the material plate formed with the step shown in FIG. 19 is curled into a cylinder.

As shown in FIGS. 20 and 21, the material plate 121 is curled with its two shorter sides arranged and held in contact at their ends while leaving the cladding plate 123 directed outward, thus preparing a cylinder 101A.

Figure 22:
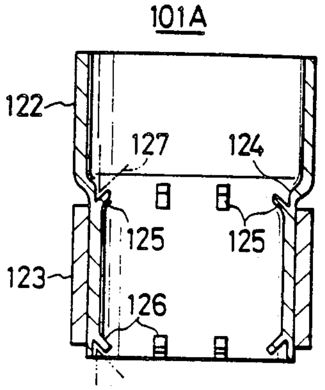
FIGS. 22 and 23 are a sectional front elevation and a top plan view showing the state in which the cylinder shown in FIGS. 20 and 21 is formed with pawls.
Figure 23:
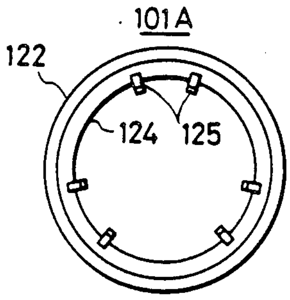

FIGS. 22 and 23 are a sectional front elevation and a top plan view showing the state in which pawls are formed on the cylinder shown in FIGS. 20 and 21.

As shown in FIGS. 22 and 23, the cylinder 101A is is partially skived (split) by means of a slicing tool 127, as indicated by phantom lines in FIG. 22, to arrange a plurality of pawls 125 and 126 on the step 124 and the lower side portion at a predetermined spacing in the circumferential direction.

Figure 24:
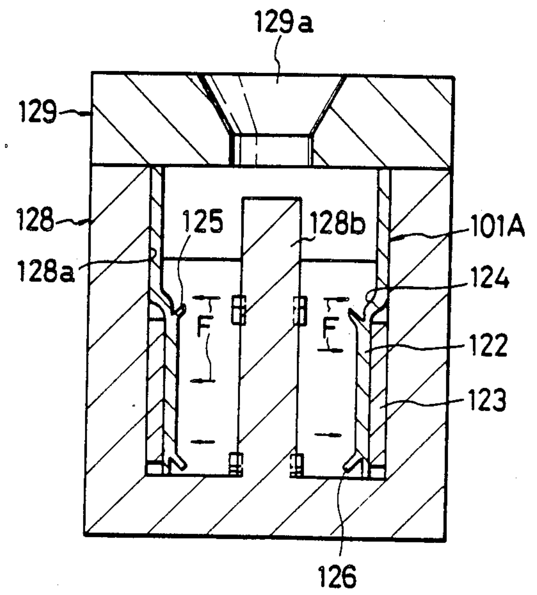
FIG. 24 is a longitudinal section showing the state in which a boss is molded of a resin in the cylinder shown in FIGS. 22 and 23.

FIGS. 24 is a longitudinal section showing the state in which a boss is molded of a resin in the cylinder shown in FIGS. 22 and 23.

The molding die to be used here is composed of a bottom part 128 and a top part 129. The bottom part 128 is formed with a cylindrical cavity 128*a* having a diameter corresponding to the external diameter of the cylinder 101A. From the bottom of the cavity 128*a*, there is projected on the center line a core 128*b* for forming an axial bore in which the commutator structure is to be fixed on the shaft of rotation. The top part 129 is formed with a gate 129*a* for injecting a molding material or resin therethrough into the cavity 128*a*.

Then, the cylinder 101A thus formed with the pawls at the preceding step is arranged and inserted concentrically with the core 128*b* into the cavity 128*a* of the bottom part 128 with the cladding plate 123 being positioned downward. Subsequently, the bottom part 128 and the top part 129 are clamped, and the resin is pumped from the gate 128*a* into the hollow portion of the cylinder 101A which is set in the cavity 128*a*. By this resin injection, the monolithic resin molding shown in FIG. 25 is made.

Here, when the resin is injected, a radially outward force F is exerted upon the cylinder 101A, as indicated by arrows in FIG. 24.

In the present embodiment, however, since the step is formed in advance on the base plate 122 at the upper end portion of the cladding plate 123, as has been described above, the cylinder 101A is not irregularly deformed even under the resin injection pressure to obviate in advance such problems of the irregular deformation and crackings as might otherwise accompany it. More specifically, since the step 124 is made to bulge such that its outer surface is coextensive with that of the cladding plate 123 so that it is supported in abutment against the inner face of the cavity 129*a*, and the cylinder 101A is not irregularly deformed, even under the outward resin injection pressure.

Figure 25:
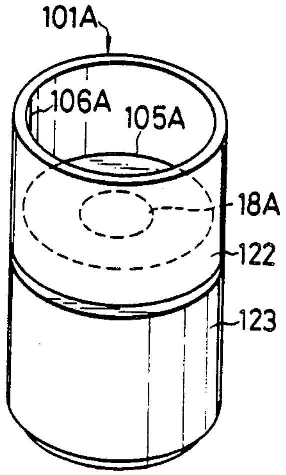
FIG. 25 is a perspective view showing a monolithic resin molding obtained by the resin molding step shown in FIG. 24.

FIG. 25 is a perspective view showing the monolithic resin molding which is obtained by the resin molding step shown in FIG. 24.

As shown in FIG. 25, a boss 105A having a recess 106A thereabove is integrally molded of a resin in the hollow portion of the cylinder 101A, and an axial bore 108A is formed on the center line of the boss 105A by a core. Although not shown, the upper and lower pawls 125 and 126 are buried in the boss 105A.

Figure 26:
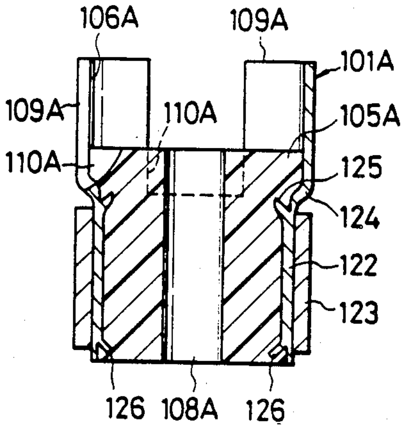
FIG. 26 is a sectional front elevation showing the state in which the monolithic resin molding is formed with riser members and recesses.

FIG. 26 is a sectional front elevation showing the state in which riser members and recesses are formed on the monolithic resin molding.

As shown in FIG. 26, the cylinder 101A and the boss 105A are cut at their upper portions by means of a cutting tool or the like, to arrange a plurality of riser members 109*a* and positioning recesses 110A substantially equi-distantly in the circumferential direction to have a predetermined width and a predetermined depth, respectively.

Figure 27:
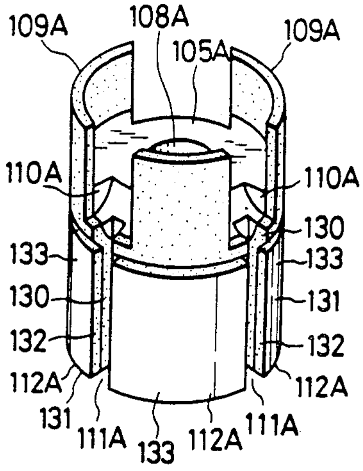
FIG. 27 is a perspective view showing the state in which individual segments are formed.

FIG. 27 is a perspective view showing the state in which individual segments are formed.

As shown in FIG. 27, the cylinder thus formed with the riser members and the recesses is cut by cutting or suitable means using a cutting tool to arrange each of a plurality of slits 111A at the central position between every adjacent two riser members 109A and 109A and in parallel with the axis. Those slits 111A are separated from one another by cutting the base plate 122 and the cladding 123 of the cylinder 101A to a depth to reach the boss 105A, to substantially form segments 112A, the adjacent two of which are electrically isolated from each other. In other words, each segment 112A is composed of a parent metal 130 and a protecting member 131 which are separated from others by the corresponding slits 111A. The parent metal 130 is integrally formed with the corresponding ones of the riser members 109A and the upper and lower pawls 125 and 126. These upper and lower pawls 125 and 126 are buried in the boss 105A to integrate the segments 112A with the boss 105A without fail.

After that, as shown in FIG. 27, each segment 112A has its surface covered with a tin-plated cover film 132 by electrolytic plating or suitable means. This tin-plated cover film 132 is provided for preventing the copper body from being exposed to a fuel such as gasohol, thereby to prevent deterioration of the fuel and to improve the durability of the commutator structures.

Next, the tin-plated cover film 132 on the protecting members 131 is removed by suitable means, using a grind stone to form exposed surfaces 133 on the protecting members 131 providing the sliding surface with the brush. Since the protecting members 131 are made of the silver-nickel alloy, it does not mutually interfere with the gasohol but has a high wear resistance.

Incidentally, in the present embodiment, since the gap G is left between the lower side of the step 124 of the parent metal 130 and the upper side of the protecting members 131, the surfaces 133 of the protecting members 132 can be wholly exposed to the outside by removing the tin-plated cover film 132 fully of the vertical width of the protecting members 131. Since the gap G is left even the whole surfaces of the protecting members 131 are cut, more specifically, there is no fear of cutting off the tin-plated cover film 132 from the parent metal 130 so that the copper body of the parent metal 131 is not exposed to the outside. This makes it possible to effectively use the expensive protecting members 131 fully to the vertical width to provide an economical advantage.

According to the present embodiment, it is possible to provide with excellent workability the commutator structure which is enabled to cope with the gasohol by cladding at least such a surface of the parent copper of the segments with the protecting members of the silver-nickel alloy as will contact with the brush.

Incidentally, the present invention should not be limited to the embodiment thus far described. For example, in the embodiment, the cylinder should not be limited to that prepared by cutting a pipe but may be prepared by curling a material plate, as in the embodiment 2.

As has been described hereinbefore, according to the commutator structure manufacturing process of the present invention, the boss is molded in the hollow portion of the cylinder left as it is and has its one end portion cut to form the riser members and the recesses so that the cylinder can be easily set in the molding die. Since this molding die has no rough surface, moreover, it is possible to obviate the residual of the molding material and the occurrence of the insufficient insertion.

Figure 29:
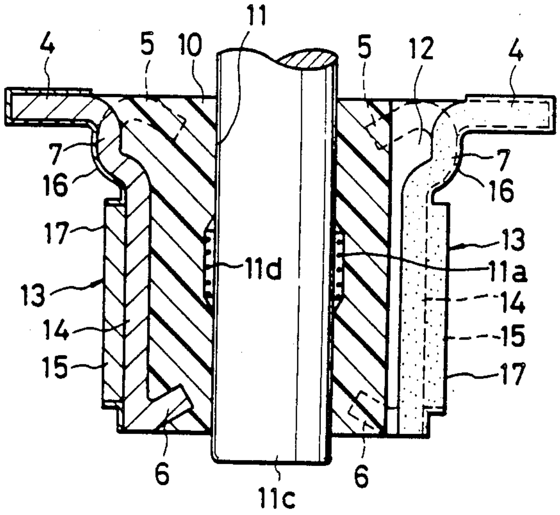
FIG. 29 is a longitudinal section showing the state in which a shaft is press-fitted in the bore of the commutator structure of FIG. 28.
Figure 30:
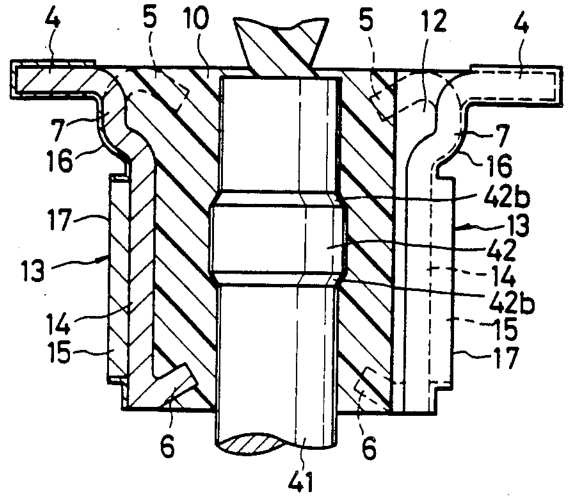
FIG. 30 is a longitudinal section showing an example of the process for manufacturing the commutator structure of FIG. 28.

FIGS. 29 to 30 show a further embodiment of the present invention.

The commutator structure of the present invention is fundamentally similar to that shown in FIG. 1 but different therefrom in that a circumferential groove **11*a* is formed midway of the axial bore 11 of the boss 10. As a result, the groove 11*a* has a larger internal diameter than that of the other portions of the axial bore 11. Moreover, the merging portions of the two axial ends of the groove 11*a* into the axial bore 11 are tapered, as denoted at 11*b***.

The purpose of providing that groove **11*a* is to trap the chips 11*d* of the synthetic resin, for example, which are generated when the shaft (as shown in FIG. 29) of an armature (although not shown) is press-fitted in the axial bore 11**.

Therefore, the function of the groove **11*a* will be described by taking up the case in which the shaft 11*c* of the armature is press-fitted in the axial bore 11 of the boss 10. Specifically, the shaft 11*c* can be press-fitted into the axial bore 11 from above, as viewed in the example of FIG. 28, whereupon the shaft 11*c* is at first fitted in a press-fitting portion 11*e* at the upper end side of the axial bore 11. At this time, the synthetic resin of the inner circumference of the press-fitting portion 11*e* is shaved to generate the chip 11*d* (as shown in FIG. 29) as the shift 11*c* is fitted to slide on the press-fitting portion 11*e***.

This chip **11*d* increases with the increase in the advance of the shaft 11*c* being press-fitted. As the shaft 11*c* comes to a predetermined position, in which its leading end reaches the groove 11*a*, and passes the lower end of the groove 11*a*, the chip 11*d* sticking to the outer circumference of the shaft 11*c* is trapped by the groove 11*c* so that it is not carried to the lower position from the groove 11*a* by said shaft 11*c***.

As a result, the shaft **11*c* can smoothly reach the lower end of the axial bore 11 without inviting any trouble in the press-fitting operation of the shaft 11*c* by the chip 11*d*, when it is press-fitted into the axial bore 11** of the commutator structure.

Thus, the clogging with the chip **11*d*** can be remarkably reduced to make it reluctant to disperse the press-fitting force of the shaft into the commutator structure so that the commutator structure can save its resin portion from being cracked.

In the present invention, it is desirable that the depth of the groove **11*a* to 1 μm to 30 μm. If the groove 11*a* is shallower than 1 μm, the reduction ratio of the contacting pressure between the chip 11*d* and the outer circumference of the shaft 11*c* is so low even if the chip 11*d* resides in the groove 11*a* that the shaft press-fitting pressure is liable to disperse. If the groove 11*a* is deeper than 30 μm, on the other hand, the fixing action of the shaft 11*c* in the commutator structure is liable to become weak. Incidentally, the depth of the groove 11*a*** is suitably set in accordance with the press-fitting allowance.

Next, a process for manufacturing the commutator structure according to the present invention will be described in the following with reference to FIG. 30.

Figure 28:
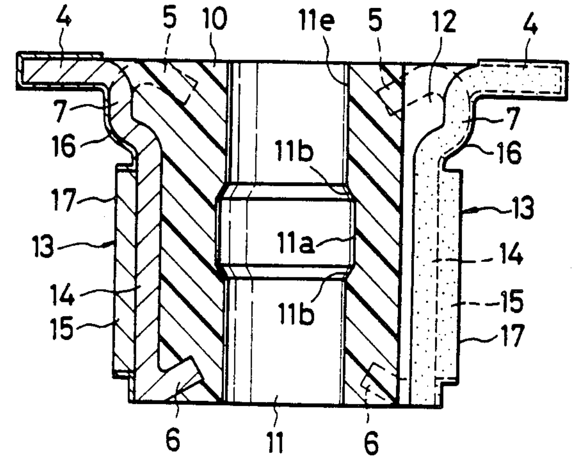
FIG. 28 is a longitudinal section showing a commutator structure according to still another embodiment of the present invention.

In FIG. 30, a stepped center pin 41 formed with a land 42 corresponding to the shape of the groove **11*a* of FIG. 28 is arranged at the center in the axial direction, and the commutator structure is arranged at a predetermined spacing around the outer circumference of that center pin 41. The boss 10** having a predetermined shape is formed by molding a synthetic resin material.

According to this manufacturing process, the central portion of the boss 10 is prevented from bulging at the molding step by forming a relief provided by the recesses. After this molding step, the stepped center pin 41 is extracted. Since, however, the resin boss 10 itsef has elasticity, the extraction of the step inside can be realized. After this extraction, the boss 10 returns to a predetermined shape by its own restoring force to form the groove **11*a* (by the so-called "dieless extraction"). Since, at this time, the two ends of the land 42 of the center pin 41 corresponding to the step 11*b* of the axial bore 11 are tapered, as donoted at 42*b*, the extraction of the center pin 41** can be easily performed.

After this center pin 41 has been extracted, the axial bore 11 of the boss 10 has its inner circumference cut by means of a reamer (although not shown) to provide the press-fitting allowance. In this reaming treatment, the central portion of the boss 10 has little bulging so that the cutting allowance is stabilized to reduce the errors in the roundness and cylindricity due to changes in the load upon the reamer and in the heat generation, to improve the accuracy in the finishing treatment and the sizing stability. Because of little bulging of the boss, moreover, it is not absolutely necessary to cut the inner circumference of the axial bore 11.

Figure 31:
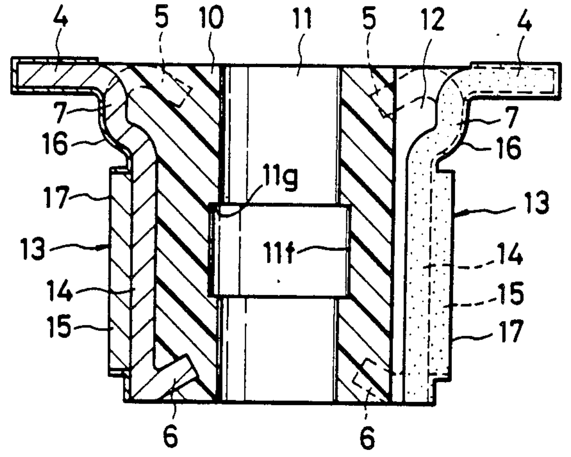
FIG. 31 is a longitudinal section showing a commutator structure according to a further embodiment of the present invention.

Incidentally, the merging portions between the groove and the press-fitting portion formed in the axial bore 11 of the boss 10 need not always be sloped, as in the aforementioned embodiment, but may be formed into a groove 11*f* which has a step 11*g* directed normal to the axial direction of the axial bore 11, as shown in FIG. 31.

As has been described hereinbefore, according to the present embodiment, the axial bore of the boss of the commutator structure, in which the shaft of the armature is to be press-fitted, is formed with the groove midway thereof except its entrance and exit taken in the press-fitting direction. As a result, the chip generated when the shaft is press-fitted in the axial bore of the commutator structure is left in that groove to remarkably reduce the clogging at the press-fitting portion so that the commutator structure is prevented from bulging from its inside more than the press-fitting allowance. As a result, the work of press-fitting the shaft into the bore of the commutator structure is facilitated, and this structure can be prevented from being cracked. When the commutator structure is to be made, moreover, the stepped center pin can be used to prevent the internal bulging of the resin portion of the structure, to facilitate the work of cutting the inner circumference of the bore and to improve the sizing stability.

Figure 32:
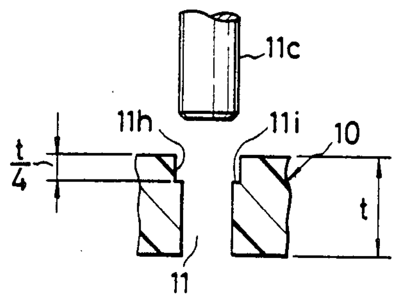
FIG. 32 is a partial section showing a commutator structure according to a further embodiment of the present invention.

FIG. 32 is a partial and schematic section showing the boss of a commutator structure according to a further embodiment of the present invention.

In this embodiment, the axial bore 11 of boss 10 made of a synthetic resin is formed with a larger-diameter portion 11*h* having a step 11*i* at its one end, i.e., at its open end where the shaft 11*c* of the armature (although not shown) is press-fitted. that larger-diameter portion 11*h* has an axial length of one quarter of that t of the bore 11, i.e., t/4.

Figure 33:
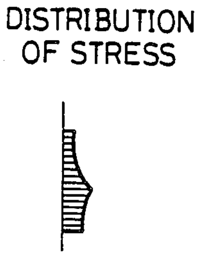
FIG. 33 is a diagram illustrating a distribution of stress in case a shaft is press-fitted in the bore of the commutator structure of FIG. 32.

Thanks to the formation of that larger-diameter portion 11*h*, the stress to be applied from the shaft 11*c* to the synthetic resin of the boss 10 when the shaft 11*c* is to be press-fitted in the axial bore 11 does not become excessive at said larger-diameter portion 11*h*, as shown in FIG. 33, but is dispersed wholly of the axial length t of the bore 11. As a result, the synthetic resin of the boss around the axial bore 11 can be prevented from being broken by the press-fit of the shaft 11*c*.

Figure 36:
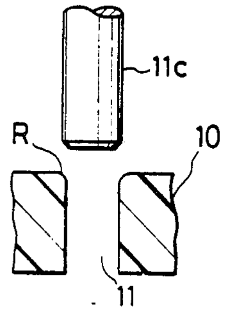
FIG. 36 PRIOR ART
FIGS. 36 and 37 are a partial section showing a commutator structure according to the prior art and a diagram illustrating a distribution of stress in case a shaft is press-fitted in the bore of the commutator structure of the prior art, respectively.
Figure 37:
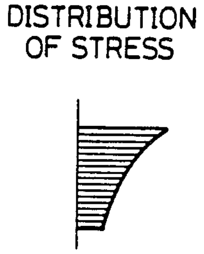
FIG. 37 PRIOR ART

On the contrary, in the prior art in which the open end of the axial bore 11 is merely rounded, as indicated at R, as shown in FIG. 36, the distribution of stress when the shaft 11*c* is to be press-fitted in the bore 11 becomes partially excessive at the press-fitting end, as shown in FIG. 37. As a result, the synthetic resin of the boss 10 is broken or deformed at its portion, to which the excessive stress is applied, i.e., at its press-fitted end.

Figure 34:
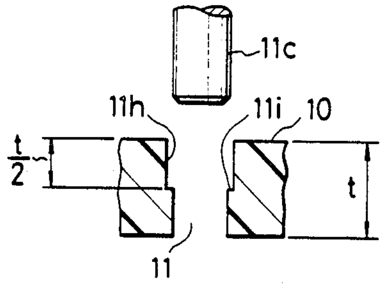
FIGS. 34 and 35 are partial sections showing commutator structures according to further embodiments of the present invention, respectively.

FIG. 34 is a partial and schematic section showing the boss according to a further embodiment of the present invention. In the embodiment of FIG. 34, the larger-diameter portion 11*h* has an axial length of one half of that t of the axial bore 11, i.e., t/2.

Figure 35:
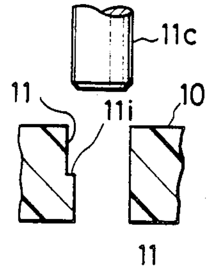

On the other hand, FIG. 35 is a partial and schematic section showing the boss according to a further embodiment of the present invention. In this embodiment, the larger-diameter portion 11*h* of the axial bore 11 is formed in only one portion in the circumferential direction.

By forming the larger-diameter portion 11*h* at the press-fitting end of the axial bore 11 of the bore 10, as in the embodiments thus far described with reference to FIGS. 32, 34 and 35, the following excellent operational effects can be attained:

(1) Since the distribution of stress to be applied to the synthetic resin material of the boss 10 is dispersed to establish no partially excessive stress, the boss 10 can be prevented from being broken or deformed;

(2) The maximum press-fitting load can be drastically improved;

(3) The maximum press-fitting allowance can be enlarged;

(4) By widening the range of the proper press-fitting allowance, the sizing allowance of the press-fitting portion can be widened to reduce the working administration; and (5) Thus, the present invention is highly effective especially for such a fragile material as is reluctant to provide the working accuracy.

Incidentally, the present invention should not be limited to the embodiments thus far described, but can be modified in various manners, and these modifications should naturally be included in the scope of the present invention.

What is claimed is:

1. A commutator of the type in which a parent metal of commutator segments is covered with a protecting cover on at least its surface for contacting with brushes, wherein said commutator segments are provided with a bulge at an end portion of said parent metal, the outer surfaces of said bulging portions being generally coextensive with the outer surface of said protecting cover.

2. A commutator according to claim 1, wherein said bulging portions are arranged adjacent to said protecting cover, face in the same direction as said protecting cover and separated by a gap from said protecting cover.

3. A commutator according to claim 1, wherein a boss molded of a synthetic resin is disposed in the inside space of the parent metal of said commutator segments and is formed with an axial bore, in which the shaft of an armature is to be press-fitted and which is formed with a groove midway of the axial length thereof.

4. A commutator according to claim 3, wherein said groove has a depth of 1 $\mu$m to 30 $\mu$m.

5. A commutator according to claim 1, wherein a boss molded of a synthetic resin is disposed in the inside space of the parent metal of said commutator segments and is formed with an axial bore, in which the shaft of an armature is to be press-fitted and which is stepped to have a larger diameter at its end portion for receiving said shaft being press-fitted.

6. A commutator according to claim 5, wherein the larger-diameter portion of said axial bore has its step located in a position of about one quarter of the axial length thereof from the open end thereof.

* * * * *